(12) United States Patent
Furuichi

(10) Patent No.: US 11,647,488 B2
(45) Date of Patent: *May 9, 2023

(54) COMMUNICATION CONTROL DEVICE, WIRELESS COMMUNICATION DEVICE, METHOD AND PROGRAM

(71) Applicant: Sony Group Corporation, Tokyo (JP)

(72) Inventor: Sho Furuichi, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 93 days.

This patent is subject to a terminal disclaimer.

(21) Appl. No.: 17/229,882

(22) Filed: Apr. 14, 2021

(65) Prior Publication Data

US 2021/0235446 A1 Jul. 29, 2021

Related U.S. Application Data

(63) Continuation of application No. 16/310,434, filed as application No. PCT/JP2017/019246 on May 23, 2017, now Pat. No. 10,993,225.

(30) Foreign Application Priority Data

Jul. 27, 2016 (JP) .............................. JP2016-147614

(51) Int. Cl.
  *H04W 72/04* (2009.01)
  *H04L 5/14* (2006.01)
  *H04W 72/0446* (2023.01)

(52) U.S. Cl.
  CPC ........... *H04W 72/0446* (2013.01); *H04L 5/14* (2013.01)

(58) Field of Classification Search
  CPC ........ H04L 1/18; H04W 60/00; H04W 68/00; H04W 76/04; H04W 8/18; H04W 60/04; H04W 68/005; H04W 48/18
  See application file for complete search history.

(56) References Cited

U.S. PATENT DOCUMENTS

2017/0180938 A1* 6/2017 Smith ................... G01S 5/0284
2017/0318470 A1* 11/2017 Srikanteswara .... H04W 52/367
2019/0285722 A1* 9/2019 Markhovsky ........... G01S 1/042

FOREIGN PATENT DOCUMENTS

CN 102740305 A 10/2012
CN 103380636 A 10/2013
(Continued)

OTHER PUBLICATIONS

Extended Search Report issued in European Application 17833810.9-1215 dated May 31, 2019.
(Continued)

*Primary Examiner* — Iqbal Zaidi
(74) *Attorney, Agent, or Firm* — Xsensus LLP

(57) ABSTRACT

[Object] To provide a communication control device, a wireless communication device, a method and a program which are capable of realizing coexistence control using information relating to a duplex mode.
[Solution] The communication control device includes: an information acquisition unit configured to acquire information indicating a network to which one or more wireless communication devices belong, radio access technology information, information relating to an operable frequency band, information relating to a geographical location and/or region, information relating to a duplex mode, or information relating to a transmission time interval; a determination unit configured to determine positional relationship among coverages of the wireless communication devices by using the information, and select an operation parameter recommended for each of the wireless communication devices in accordance with the determined positional relationship; and a notification unit configured to notify the wireless communication devices of the selected operation parameters.

10 Claims, 14 Drawing Sheets

(56) References Cited

FOREIGN PATENT DOCUMENTS

| | | |
|---|---|---|
| CN | 104380622 A | 2/2015 |
| JP | 2014-017886 A | 1/2014 |
| JP | 5679033 B2 | 3/2015 |
| WO | 2011/085073 A1 | 7/2011 |
| WO | 2011/132760 A1 | 10/2011 |
| WO | 2013/112983 A2 | 8/2013 |
| WO | 2014/027495 A1 | 2/2014 |
| WO | 2014/136333 A1 | 9/2014 |

OTHER PUBLICATIONS

English language translation of International Search Report for International Application No. PCT/JP2017/019246, dated Jul. 18, 2017.

* cited by examiner

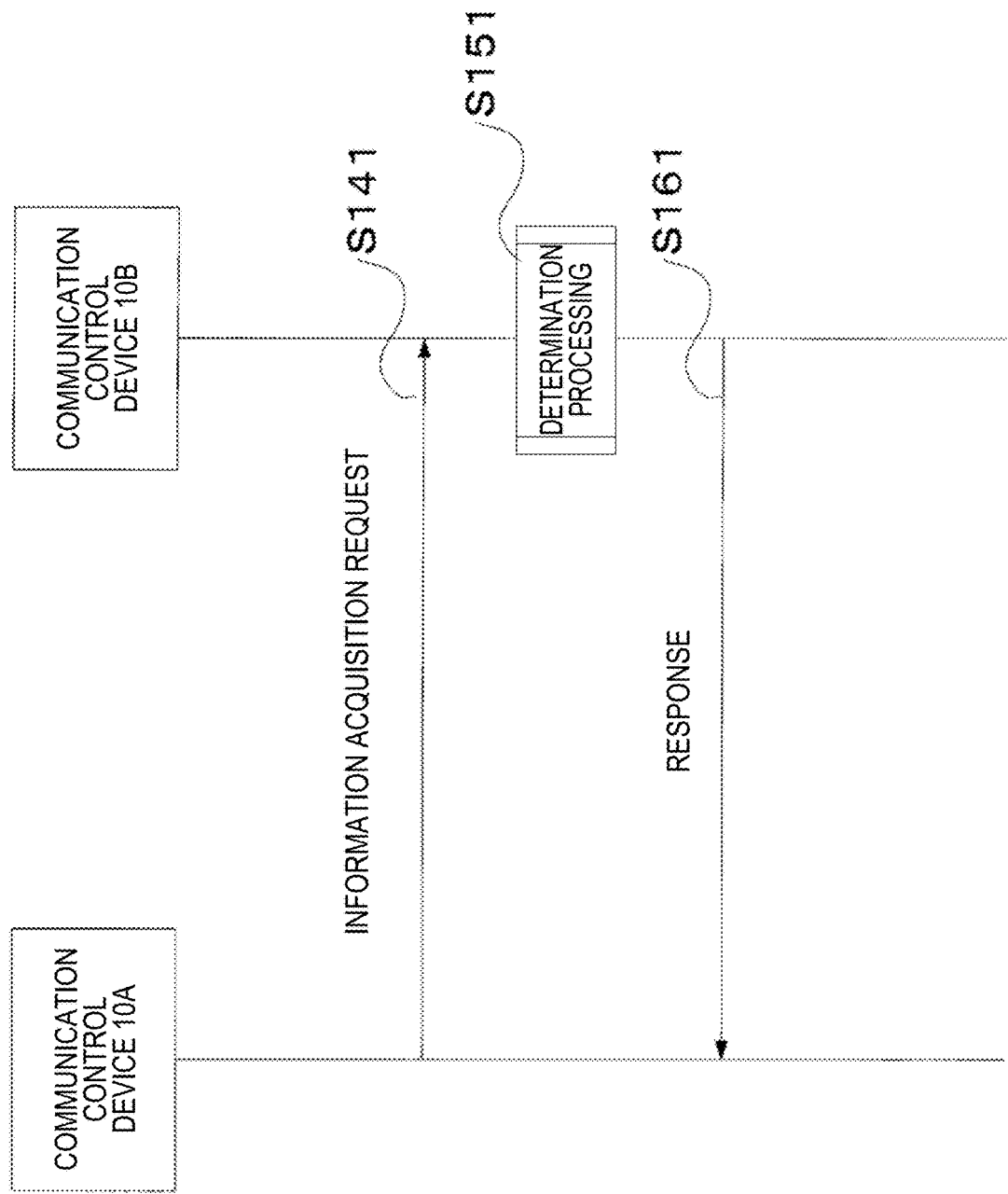

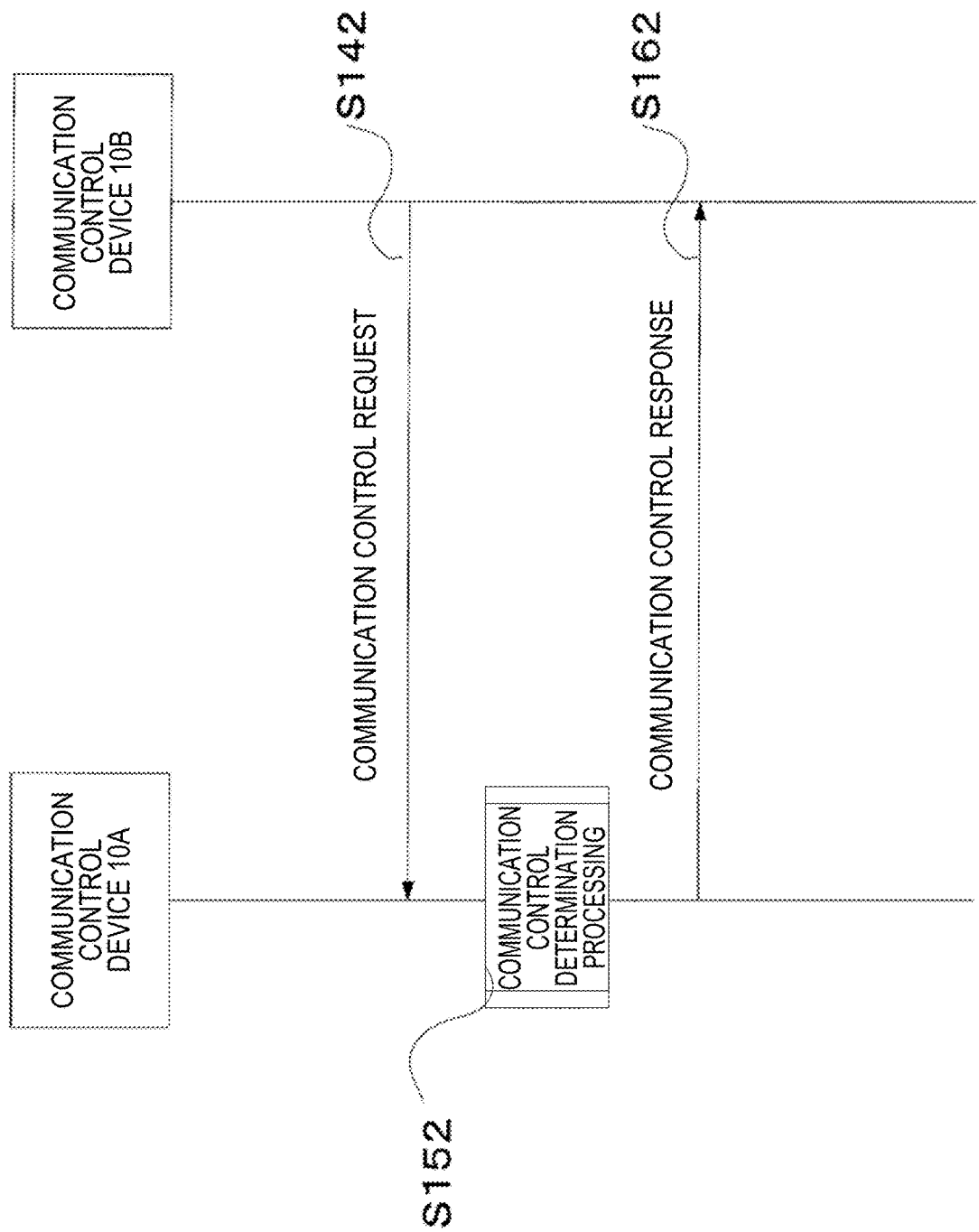

COMMUNICATION CONTROL DEVICE, WIRELESS COMMUNICATION DEVICE, METHOD AND PROGRAM

CROSS-REFERENCE TO RELATED APPLICATIONS

This application is a continuation of U.S. application Ser. No. 16/310,434, filed Dec. 16, 2018, which is a National Stage Application based on PCT/JP2017/019246, filed on May 23, 2017, and claims priority to Japanese Patent Application No. 2016-147614, filed on Jul. 27, 2016, the entire contents of each being incorporated herein by reference.

TECHNICAL FIELD

The present disclosure relates to a communication control device, a wireless communication device, a method and a program.

BACKGROUND ART

As a countermeasure to alleviate shortage of future frequency resources, secondary usage of frequencies has been discussed. Secondary usage of frequencies means that part of or all of frequency channels allocated to a certain system with a higher priority is secondarily used by another system. Generally, a system to which a frequency channel is allocated with a higher priority is called "primary system", and a system that secondarily uses the frequency channel is called "secondary system".

TV whitespaces are an example of frequency channels that are expected to be secondarily used. TV whitespaces mean frequency channels that are allocated to a TV broadcast system serving as a primary system but are not locally used by the TV broadcast system. By allowing a secondary system to use those TV whitespaces, efficient utilization of frequency resources can be achieved. There are a plurality of standards for wireless access schemes in a physical layer (PHY) and MAC layer for enabling secondary usage of the TV whitespaces, such as IEEE802.22, IEEE802.11af, and European Computer Manufacturer Association (ECMA)-392 (CogNea).

In the U.S., activities for introducing a new frequency utilization form called citizens broadband radio service (CBRS) based on secondary usage of frequencies into 3550 to 3700 MHz bands on the basis of federal communications commission (FCC) rules, part 96 which is newly adopted are accelerated. It is assumed at the present moment that long term evolution (LTE) and MulteFire for which development has been promoted in recent years on the basis of LTE become the mainstream as a wireless access system operated in CBRS.

Concerning such secondary usage of frequencies, the following Patent Literature 1 discloses a management serve including a holding unit configured to hold a location/frequency list in which location information is associated with frequency information, a list creating unit configured to extract frequency information corresponding to location information from the location/frequency list on the basis of the location information to create an available frequency list, a transmitting unit configured to transmit the available frequency list to a base station which mainly uses the available frequency list, and a list comparing unit configured to compare the available frequency list transmitted to the base station and an available frequency list returned from the base station, and the list creating unit re-creating the available frequency list on the basis of information indicating a frequency being utilized by the base station among the available frequency list.

CITATION LIST

Patent Literature

Patent Literature 1: JP 5679033B

DISCLOSURE OF INVENTION

Technical Problem

However, the technology for secondary usage of frequencies proposed in the above-described Patent Literature 1, or the like, does not assume that cellular systems operated by a plurality of different carriers are mixed. In CBRS in the U.S., operation of LTE using time division duplex (TDD) is assumed as one of embodiments, in which case it is necessary to achieve synchronization between different base stations for coexistence. In a case of LTE, within the same carrier, it is possible to utilize an interface between base stations, which is called an X2 interface. However, it is difficult to achieve synchronization between different carriers. Therefore, as well as co-channel interference, adjacent channel interference becomes problematic. In the future, because it can be easily predicted that 5th generation (5G) in which a wireless frame, or the like, is different from that in LTE or different RATs such as a radio access technology (RAT) after 5G, are operated in secondary usage of frequencies, it can be considered that it becomes more difficult to achieve synchronization between base stations.

Therefore, the present disclosure proposes a new and improved communication control device, wireless communication device, device, method and program which are capable of realizing coexistence among a plurality of different RATs, and among different carrier networks.

Solution to Problem

According to the present disclosure, there is provided a communication control device including: an information acquisition unit configured to acquire information indicating a network to which one or more wireless communication devices belong, radio access technology information, information relating to an operable frequency band, information relating to a geographical location and/or region, information relating to a duplex mode, or information relating to a transmission time interval; a determination unit configured to determine positional relationship among coverages of the wireless communication devices by using the information, and select an operation parameter recommended for each of the wireless communication devices in accordance with the determined positional relationship; and a notification unit configured to notify the wireless communication devices of the selected operation parameters.

In addition, according to the present disclosure, there is provided a communication control device including: an information acquisition unit configured to acquire information indicating a network to which one or more wireless communication devices belong, radio access technology information, information relating to an operable frequency band, information relating to a geographical location and/or region, information relating to a duplex mode, or information relating to a transmission time interval; a determination unit configured to extract a wireless communication device corresponding to the information; and a notification unit configured to make a notification of the information relating to the wireless communication device extracted by the determination unit.

In addition, according to the present disclosure, there is provided a wireless communication device including: a communication unit configured to notify a communication control device of information indicating a belonging network, radio access technology information which is being operated, information relating to an operable frequency band, information relating to a duplex mode, and information relating to a transmission time interval, and acquire a recommended operation parameter selected by the communication control device on the basis of the information; and a control unit configured to set an operation parameter on the basis of the recommended operation parameter acquired by the communication unit.

In addition, according to the present disclosure, there is provided a method including: acquiring information indicating a network to which one or more wireless communication devices belong, radio access technology information, information relating to an operable frequency band, information relating to a geographical location and/or region, information relating to a duplex mode, or information relating to a transmission time interval; determining positional relationship among coverages of the wireless communication devices by using the information, and selecting an operation parameter recommended for each of the wireless communication devices in accordance with the determined positional relationship; and notifying the wireless communication devices of the selected operation parameters.

In addition, according to the present disclosure, there is provided a method including: acquiring information indicating a network to which one or more wireless communication devices belong, radio access technology information, information relating to an operable frequency band, information relating to a geographical location and/or region, information relating to a duplex mode, or information relating to a transmission time interval; extracting a wireless communication device corresponding to the information; and making a notification of the information relating to the extracted wireless communication device.

In addition, according to the present disclosure, there is provided a method including: notifying a communication control device of information indicating a belonging network, radio access technology information which is being operated, information relating to an operable frequency band, information relating to a duplex mode, and information relating to a transmission time interval and acquiring a recommended operation parameter selected by the communication control device on the basis of the information; and setting an operation parameter on the basis of the recommended operation parameter.

In addition, according to the present disclosure, there is provided a program for causing a computer to function as: an information acquisition unit configured to acquire information indicating a network to which one or more wireless communication devices belong, radio access technology information, information relating to an operable frequency band, information relating to a geographical location and/or region, information relating to a duplex mode, or information relating to a transmission time interval; a determination unit configured to determine positional relationship among coverages of the wireless communication devices by using the information and select an operation parameter recommended for each of the wireless communication devices in accordance with the determined positional relationship; and a notification unit configured to notify the wireless communication devices of the selected operation parameters.

In addition, according to the present disclosure, there is provided a program for causing a computer to function as: an information acquisition unit configured to acquire information indicating a network to which one or more wireless communication devices belong, radio access technology information, information relating to an operable frequency band, information relating to a geographical location and/or region, information relating to a duplex mode, or information relating to a transmission time interval; a determination unit configured to extract a wireless communication device corresponding to the information; and a notification unit configured to make a notification of the information relating to the wireless communication device extracted by the determination unit.

In addition, according to the present disclosure, there is provided a program for causing a computer to function as: a communication unit configured to notify a communication control device of information indicating a belonging network, radio access technology information which is being operated, information relating to an operable frequency band, information relating to a duplex mode, and information relating to a transmission time interval, and acquiring a recommended operation parameter selected by the communication control device on the basis of the information; and a control unit configured to set an operation parameter on the basis of the recommended operation parameter acquired by the communication unit.

Advantageous Effects of Invention

As described above, according to the present disclosure, it is possible to realize coexistence among a plurality of different RATs and among different carrier networks. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 13 is a diagram for explaining an example of procedure performed among a plurality of communication control devices according to the present embodiment.

FIG. 14 is a diagram for explaining an example of procedure performed among a plurality of communication control devices according to the present embodiment.

MODE(S) FOR CARRYING OUT THE INVENTION

Figure 1:
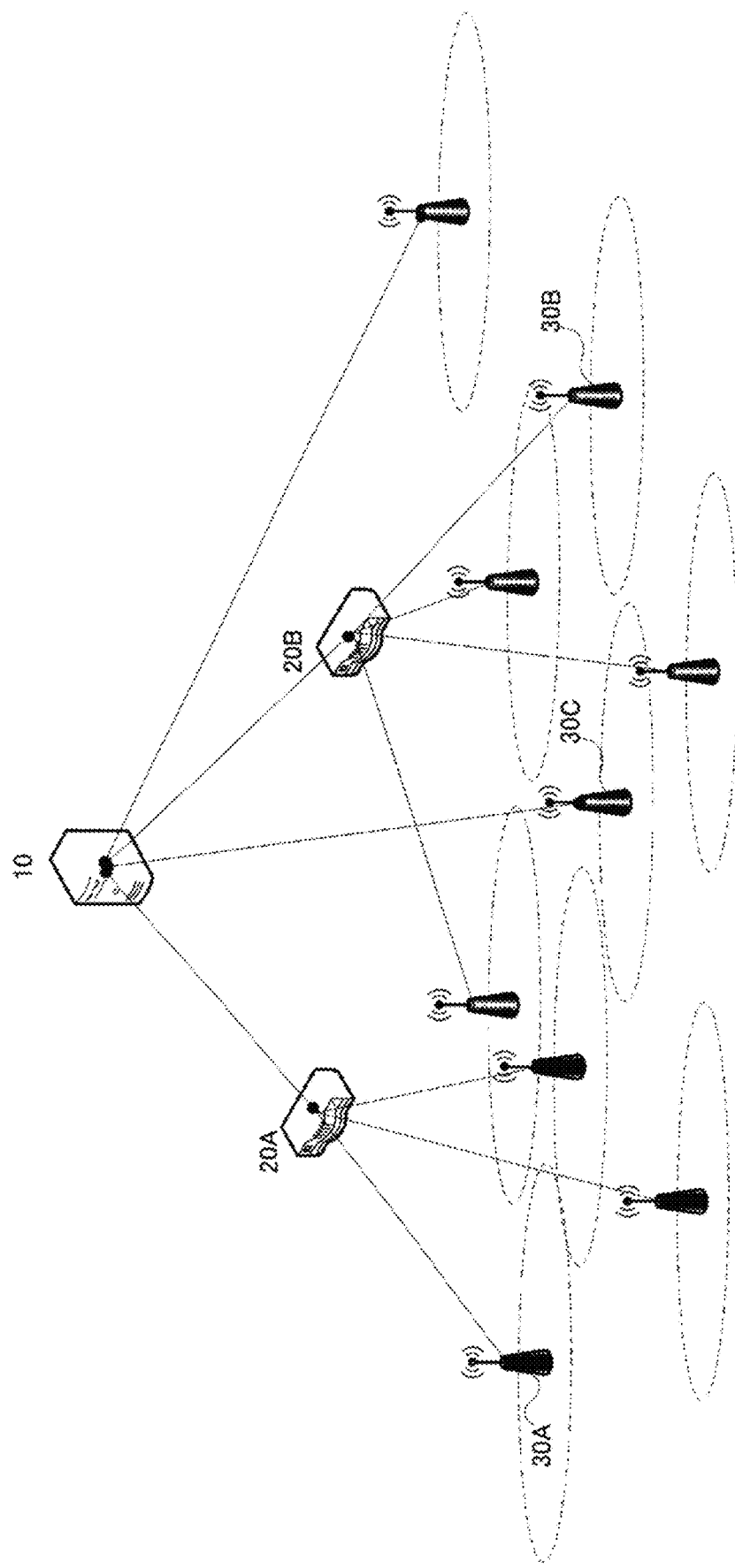
FIG. 1 is an explanatory diagram for explaining outline of a communication system according to an embodiment of the present disclosure.

Hereinafter, a preferred embodiment of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, in the present specification and drawings, elements that have substantially the same function and structure are distinguished in some cases by adding different alphabets after the same reference numerals. For example, a plurality of elements that have substantially the same function and structure are distinguished like communication control devices 10A and 10B according to necessity. However, in a case where it is not particularly necessary to distinguish among a plurality of elements that have substantially the same function and structure, the same reference numerals are merely given. For example, in the case where it is not particularly necessary to distinguish among the communication control devices 10 A and 10B, they are simply referred to as a communication control device 10.

Note that description will be provided in the following order.

1. Outline
1.1. Overall system configuration
1.2. Technical problems
2. First Embodiment
2.1. Architecture
2.2. Configuration example of communication control device
2.3. Technical features of communication control device
2.4. Configuration example of wireless communication device
2.5. Technical features of wireless communication device
2.5. Procedure
3. Second Embodiment
3.1. Architecture
3.2. Configuration example of communication control device
3.3. Technical features of communication control device
3.4. Procedure
4. Conclusion

1. OUTLINE

<1.1. Overall System Configuration>

FIG. 1 is an explanatory diagram for explaining outline of a communication system according to an embodiment of the present disclosure.

Referring to FIG. 1, a plurality of wireless communication devices 30A operated by a first telecommunications carrier A, and a plurality of wireless communication devices 30B operated by a second telecommunications carrier B are illustrated. In addition, the wireless communication device 3C is a wireless communication device that is not managed by a telecommunications carrier. As illustrated in FIG. 1, the wireless communication device 30 is typically a base station, or a transmitting station such as an access point. The wireless communication device 30A which is a transmitting station provides service of the telecommunications carrier A to a receiving station located inside a service area. The wireless communication device 30B which is a transmitting station also provides service of the telecommunications carrier B to a receiving station located inside a service area in a similar manner.

The wireless communication devices 30A and 30B are respectively connected to network management devices 20A and 20B. The network management device 20 is a device introduced by a telecommunications carrier to manage and control the plurality of wireless communication devices 30.

Note that, in LTE, for example, the network management device 20 may be a device called an element management system (EMS) or a domain manager (DM). Alternatively, the network management device 20 may be entity called domain proxy (DP) included in an architecture standardized in a wireless innovation forum (WInnF). Alternatively, a management device which integrally provides the EMS, the DM and the DP or an aggregate of these may be handled as the network management device.

The network management devices 20A and 20B are connected to a communication control device 10. In addition, the independent wireless communication device 30C is also connected to the communication control device 10. The communication control device 10 provides permission of secondary usage of frequency channels allocated to a primary system to the wireless communication device 30 within a range not providing fatal interference to the primary system. Specifically, the communication control device 10 has a function of notifying each of the wireless communication devices of a list of available frequencies and/or transmission power, or a function of determining whether or not a frequency and/or transmission power which the wireless communication device 30 desires to use can be used and notifying each of the wireless communication devices of the determination result, and typically, protects the primary system. The network management device 20 mediates communication between the plurality of subordinate wireless communication devices 30 and the communication control device 10 and/or assists re-configuration of wireless parameters of the wireless communication devices 30 on the basis of information obtained from the communication control device 10.

Note that examples of the primary system encompass TV broadcast systems, program making and special events (PMSE), radars (military radar, ship-based radar, weather radar, or the like), fixed satellite services (FSS), mobile satellite services (MSS), earth exploration satellite services (EESS), and the like.

Further, the communication control device 10 performs control and judgment so that each of the plurality of wireless communication devices 30 can operate without providing fatal interference to other wireless communication devices 30. Typically, the communication control device 10 performs coexistence management.

Here, there is a case where service areas of a plurality of telecommunications carriers geographically overlap with each other, and frequency bands used overlap with each other. As a specific example, for example, there can be a case where an area where long term evolution (LTE) service is provided and an area where Wi-Fi service is provided overlap with each other, the LTE service and the Wi-Fi service being operated by different telecommunications carriers. Alternatively, for example, there can be a case where an area where long term evolution (LTE) service is provided and an area where 5G and/or further advanced service is provided overlap with each other, although the LTE service and the 5G and/or further advanced service being operated by the same telecommunications carrier. Alternatively, for example, there can be a case where an area where wireless communication service (such as LTE and 5G) operated by a telecommunications carrier is provided and an area where a wireless communication device which is personally operated is operated overlap with each other.

In the present embodiment, it is assumed that part or all of frequency bands allocated to the primary system are secondary used by one or more wireless communication devices in cooperation with each other under such circumstances. To realize this, it is desirable that, appropriate information for coexistence is exchanged between different telecommunications carriers and between different wireless communication devices. Alternatively, it is desirable that control is judged by the communication control device using appropriate information.

<1.2. Technical Problems>

There are the following concerns in coexistence among different telecommunications carriers and among different wireless communication devices.

(1) Synchronization Between Wireless Communication Devices Belonging to Different Carriers It is assumed that the wireless communication devices are operated in TDD. In a case of LTE, wireless frame configurations having different combination of uplink and downlink are specified, and to reduce interference, it is necessary to set the same combination between wireless communication devices. Further, it is also necessary to achieve temporal synchronization. Within the same carrier, by utilizing an X2 interface specified as an interface between wireless communication devices (base stations), synchronization can be easily achieved between the wireless communication devices.

(2) Synchronization Between Wireless Communication Devices Having Different RATs The RAT operated in secondary usage of frequencies is not necessarily limited to LTE. 5G or RATs in further advanced generation may be operated. In such a case, because wireless frame configurations are different among RATs, even within the same carrier, it is difficult to achieve synchronization between the wireless communication devices having different RATs. If the wireless communication devices belong to different carriers, it becomes further difficult to secure synchronization.

Therefore, in view of the above-described circumstances, the invention according to the embodiments of the present disclosure has been achieved. In secondary usage of frequencies so far, there has not been provided coexistence control which is focused on a duplex mode of the wireless communication device. Due to lack of information relating to a duplex mode, for example, co-channel interference or adjacent channel interference can occur. Therefore, in the present embodiment, in a case where the communication control device manages secondary usage of frequencies and controls coexistence, information relating to a duplex mode is exchanged, and coexistence control is judged on the basis of the information. By this means, it is possible to realize coexistence among different telecommunications carriers and among different wireless communication devices.

2. FIRST EMBODIMENT

<2.1. Architecture>

Figure 2:
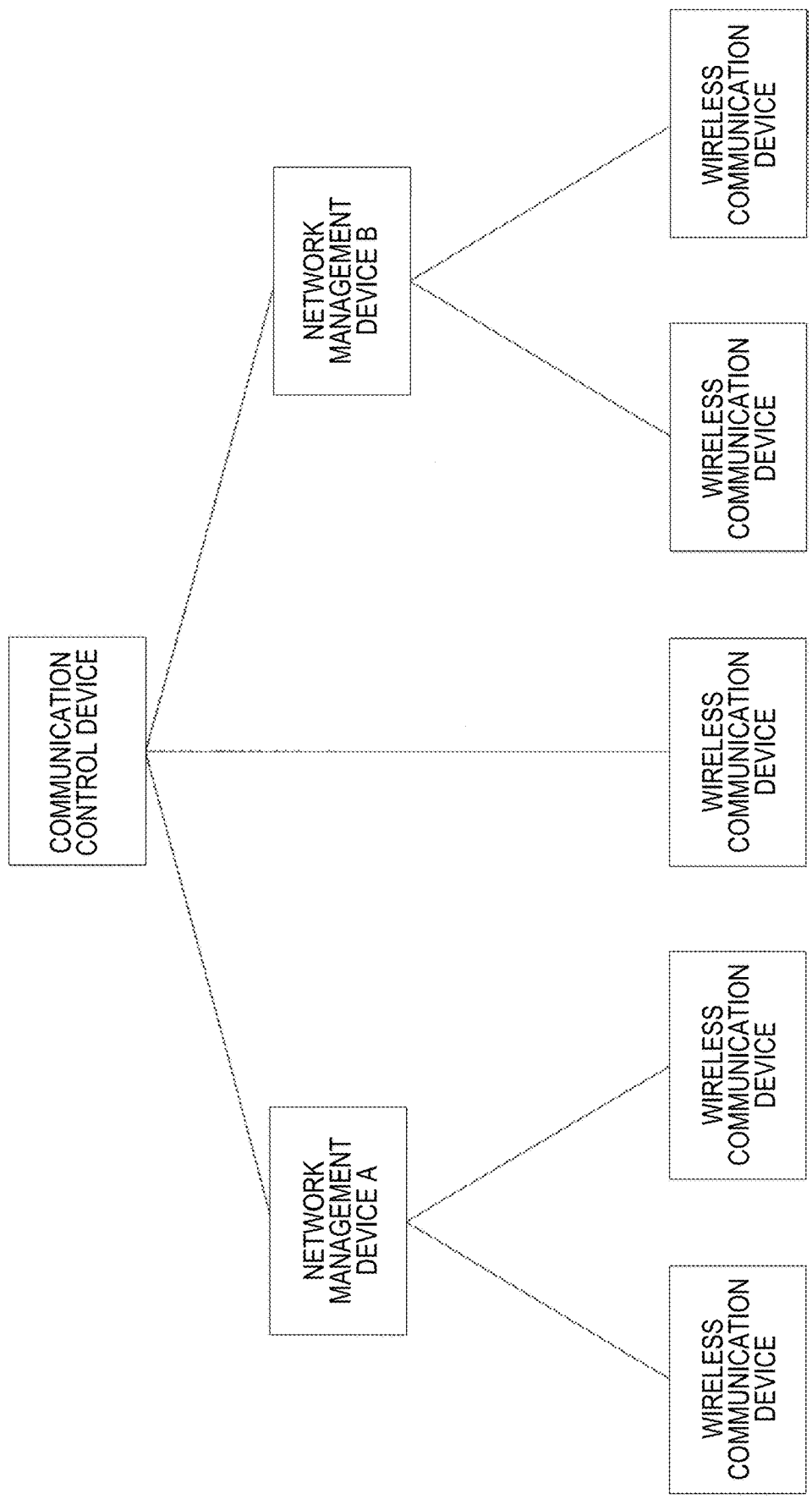
FIG. 2 is a diagram for explaining an architecture according to the present embodiment.

FIG. 2 is a diagram for explaining an architecture according to the present embodiment.

<2.2. Configuration Example of Communication Control Device>

A configuration example of the communication control device will be described below with reference to FIG. 3.

Figure 3:
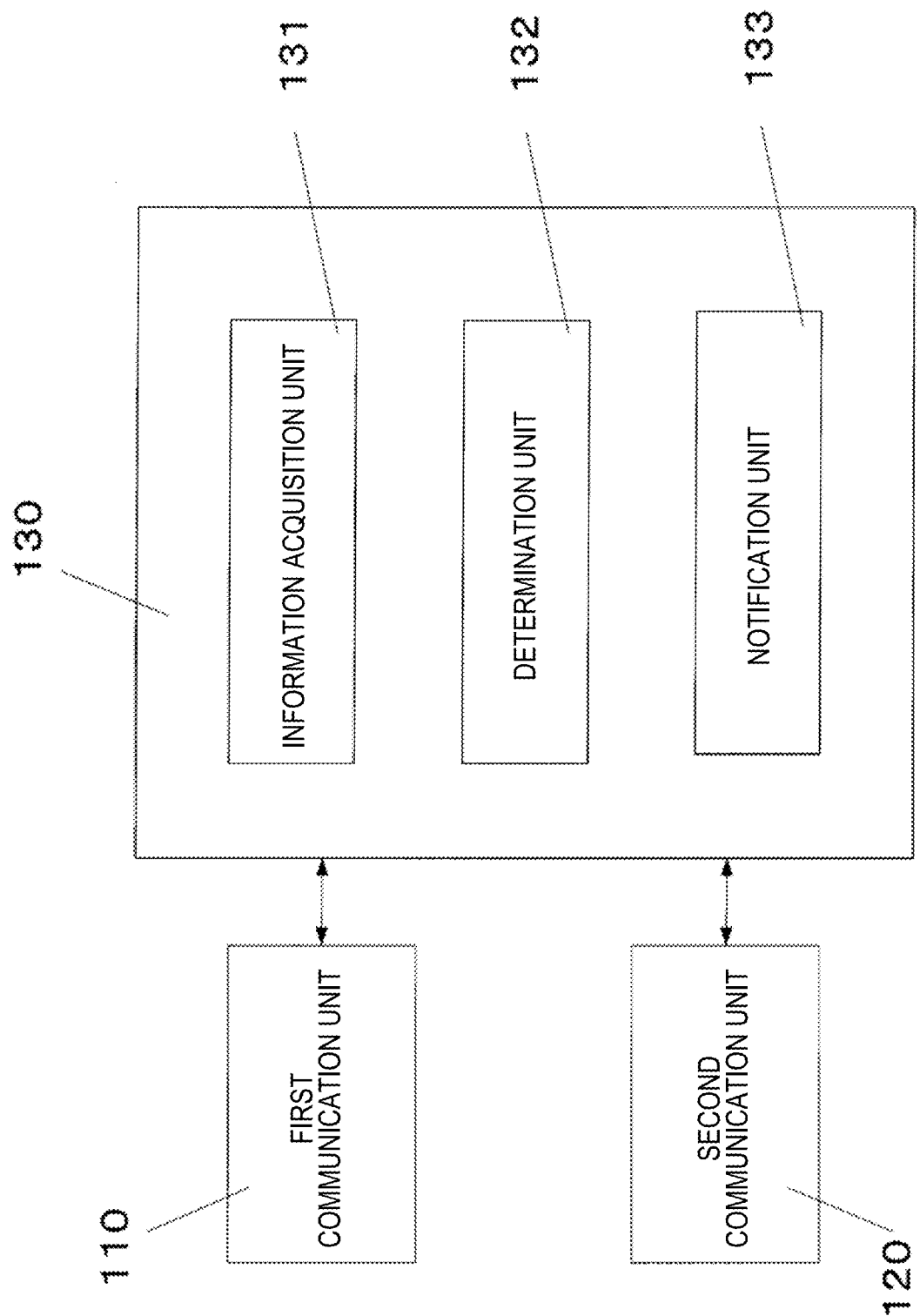
FIG. 3 is a block diagram illustrating an example of a configuration of a communication control device according to the present embodiment.

FIG. 3 is a block diagram illustrating an example of a configuration of the communication control device 10 according to the present embodiment. As illustrated in FIG. 3, the communication control device 10 includes a first communication unit 110, a second communication unit 120 and a processing unit 130. Further, the processing unit 130 includes an information acquisition unit 131, a determination unit 132 and a notification unit 133.

The first communication unit 110 is a communication interface which mediates communication between the communication control device 10 and the network management device 20 and/or the wireless communication device 30. The first communication unit 110 supports arbitrary wireless communication protocol or wired communication protocol and establishes communication connection with one or more network management devices 20 and/or the wireless communication devices 30.

The processing unit 130 provides various functions of the communication control device 10. The processing unit 130 includes the information acquisition unit 131, the determination unit 132 and the notification unit 133. Note that the processing unit 130 can further include structural elements other than these structural elements. That is, the processing unit 130 can perform operation other than operation of these structural elements. Functions of the processing unit 130 will be described in detail later.

<2.3. Technical Features of Communication Control Device>

(1) Information Acquisition Function

The information acquisition unit 131 acquires information necessary for judgement of coexistence control among one or more wireless communication devices 30. The information acquisition unit 131 acquires at least information indicating a network to which a wireless communication device belongs, radio access technology information, information relating to an operable frequency band, information relating to a location, information relating to a duplex mode or information relating to transmission time.

Note that part or all of the information may be directly acquired from the wireless communication device 30. Alternatively, in the case where part or all of the information is managed at an information management device which belongs to an external network or an intra-network, the part or all of the information may be acquired from the information management device.

The information indicating a network to which the wireless communication device belongs is typically an identifier indicating a telecommunications carrier. A mobile network code (MNC), a public land mobile network (PLMN) ID, or the like, can be assumed. In the case where the telecommunications carrier further groups the wireless communication devices, an identifier indicating a group to which the wireless communication device belongs may be included. Further, in the case where one or more network management devices 20 are provided by one telecommunications carrier, an identifier for identifying the network management device may be included. In the case where the wireless communication device is a RAT which provides an autonomous distributed network such as Wi-Fi, the information may be an identifier indicating a local network such as an SSID.

The radio access technology information is typically an identifier indicating a RAT provided at the wireless communication device. The radio access technology information may include an identifier of the RAT which can be changed by the wireless communication device as well as an identifier of a RAT which is being operated. Further, an operation parameter which is unique to a RAT, which can contribute to judgement of coexistence control, such as Transmission Mode defined in LTE may be included.

The information relating to the operable frequency band is typically a frequency band at which the wireless communication device can operate with a hardware configuration thereof. For example, a beginning frequency and an end frequency may be provided. Alternatively, for example, the number of a band specified in the 3rd generation partnership project (3GPP) may be provided. Alternatively, for example, in the case where a channel number is allocated as in a TV frequency band, the channel number may be provided. Alternatively, for example, the operable frequency band may be provided using combination of a center frequency and a bandwidth. Whichever information is provided, in the case where the wireless communication device can operate in a plurality of frequency bands, a plurality of pieces of the information relating to the operable frequency bands may be provided.

The information relating to the location is typically information which can specify a geographically location and/or region of the wireless communication device. For example, the information may be coordinate information acquired by the wireless communication device including a positioning function typified by a global navigation satellite system (GNSS). Typically, information relating to longitude, latitude, altitude and a positioning error can be included. Alternatively, for example, the information may be location information registered in an information management device managed by national regulatory authority (NRA) or entrusted institution thereof. Further, for example, as the information indicating the geographical region, information such as census tract, area name, prefecture name, state name, town name, block number, and address can be included as information which is administratively defined. Alternatively, for example, the geographical region may be expressed with combination of three or more pieces of coordinate information. Alternatively, for example, the geographical region may be expressed with combination of coordinate information and radius information.

The information relating to the duplex mode includes at least an identifier indicating a duplex mode which is being operated at the wireless communication device. The information can include an identifier indicating frequency division duplex (FDD), time division duplex (TDD), supplemental downlink (SDL), full duplex, or the like. In the case where the identifier indicates TDD, further, the information includes an identifier indicating a configuration which is being operated among TDD frame configurations indicated in the following Table 1.

TABLE 1

| Configuration | Switch-point periodicity | Subframe number | | | | | | | | |
|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The above-described Table 1 indicates configurations in 3GPP TS 36.300.

The information relating to the transmission time is typically a transmission time interval (TTI). Further, if the TTI is variable, the information may include a TTI value which can be changed by the wireless communication device.

(2) Determination Function

The determination unit 132 typically has a function of judgement relating to coexistence control. Specifically, the determination unit 132 compares service areas or coverages provided by the respective wireless communication devices using the information of one or more wireless communication devices acquired at the information acquisition unit and determines positional relationship among the wireless communication devices. Here, determination described below is performed.

(Case 1)

Figure 4:
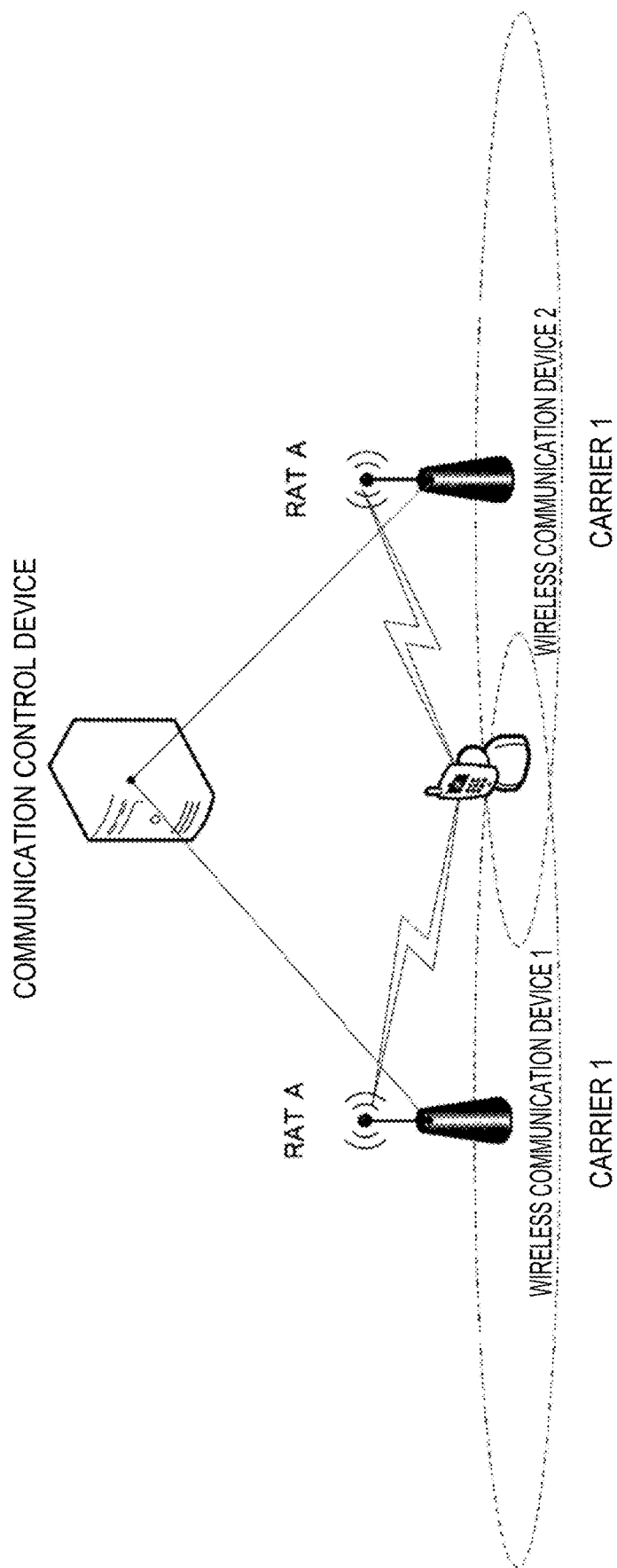
FIG. 4 is a diagram illustrating an example of arrangement of wireless communication devices according to the present embodiment.

FIG. 4 illustrates a situation where a plurality of wireless communication devices 30 belonging to the same carrier operate the same RAT, and coverages partly overlap with each other. In such a situation, it is possible to utilize a coexistence mechanism such as listen-before-talk (LBT), which is provided at the wireless communication device 30 and which is unique to the RAT. Further, because the wireless communication devices 30 belong to the same carrier, it is also possible to utilize unique coexistence algorithm by the network management device 20 and an interface (e.g., an LTE X2 interface) between the wireless communication devices 30. It is also possible to easily achieve synchronization between the wireless communication devices 30 upon TDD.

Therefore, in such a case, the same frequency band may be allocated or different frequency bands may be allocated to the wireless communication devices 30.

(Case 2)

Figure 5:
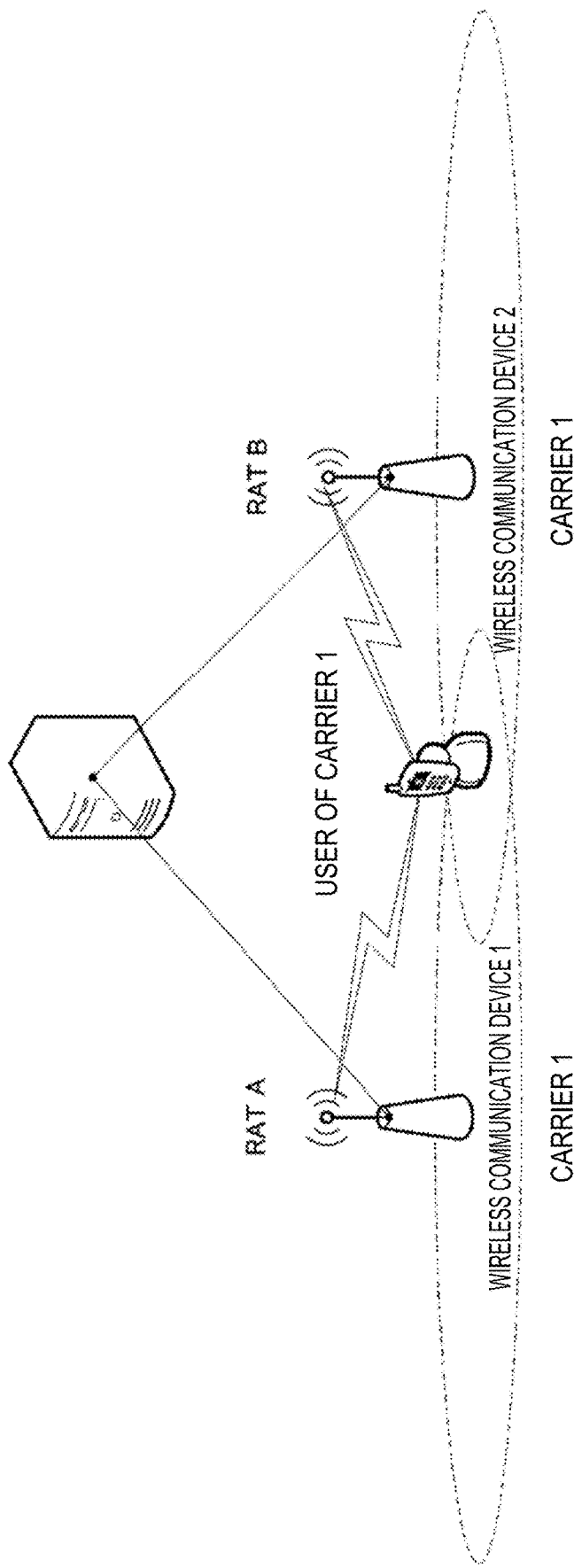
FIG. 5 is a diagram illustrating an example of arrangement of wireless communication devices according to the present embodiment.

FIG. 5 illustrates a situation where a plurality of wireless communication devices 30 belonging to the same carrier operates different RATs, and coverages partly overlap with each other. In such a case, it can be considered that a sensing type coexistence mechanism such as LBT is not very effective due to a difference in wireless frame configurations, reference signals, or the like. Further, even if temporal synchronization can be achieved between the wireless communication devices 30, it is considered difficult to control interference even within the same carrier due to a difference in wireless frame configurations. Still further, in a case of TDD, it is desirable to provide a guard band because even adjacent channel interference can become a serious problem.

Therefore, in such a case, an available frequency band which is notified from the communication control device 10 to each wireless communication device 30 includes at least different frequency bands.

(Case 3)

Figure 6:
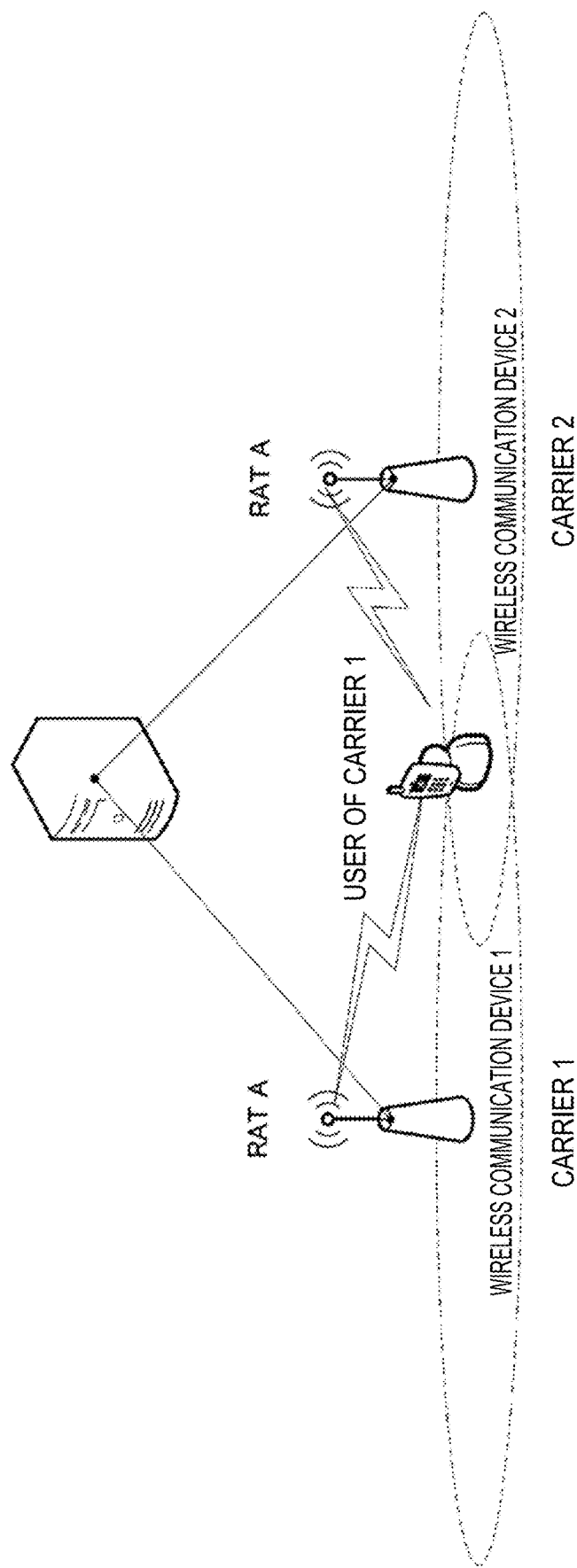
FIG. 6 is a diagram illustrating an example of arrangement of wireless communication devices according to the present embodiment.

FIG. 6 illustrates a situation where the wireless communication devices 30 belonging to different carriers operate the same RAT, and coverages partly overlap with each other. In such a case, there is a possibility that a coexistence mechanism such as LBT which is provided at the wireless communication device 30 and which is unique to the RAT comes into effect. However, because the wireless communication devices 30 belong to different carriers, it is difficult to realize coexistence among carriers by utilizing unique coexistence algorithm by the network management device 20 or an interface (e.g. an LTE X2 interface) between the wireless communication devices 30. Further, in a case of TDD, it is desirable to provide a guard band because adjacent channel interference can become a serious problem. Therefore, in such a case, an available frequency band which is notified from the communication control device 10 to each wireless communication device includes at least different frequency bands. Further, TDD frame configuration information of an adjacent coverage is provided to each wireless communication device. Alternatively, the communication control device 10 selects a TDD frame configuration recommended for each wireless communication device and provides the recommended TDD frame configuration to each wireless communication device.

(Case 4)

Figure 7:
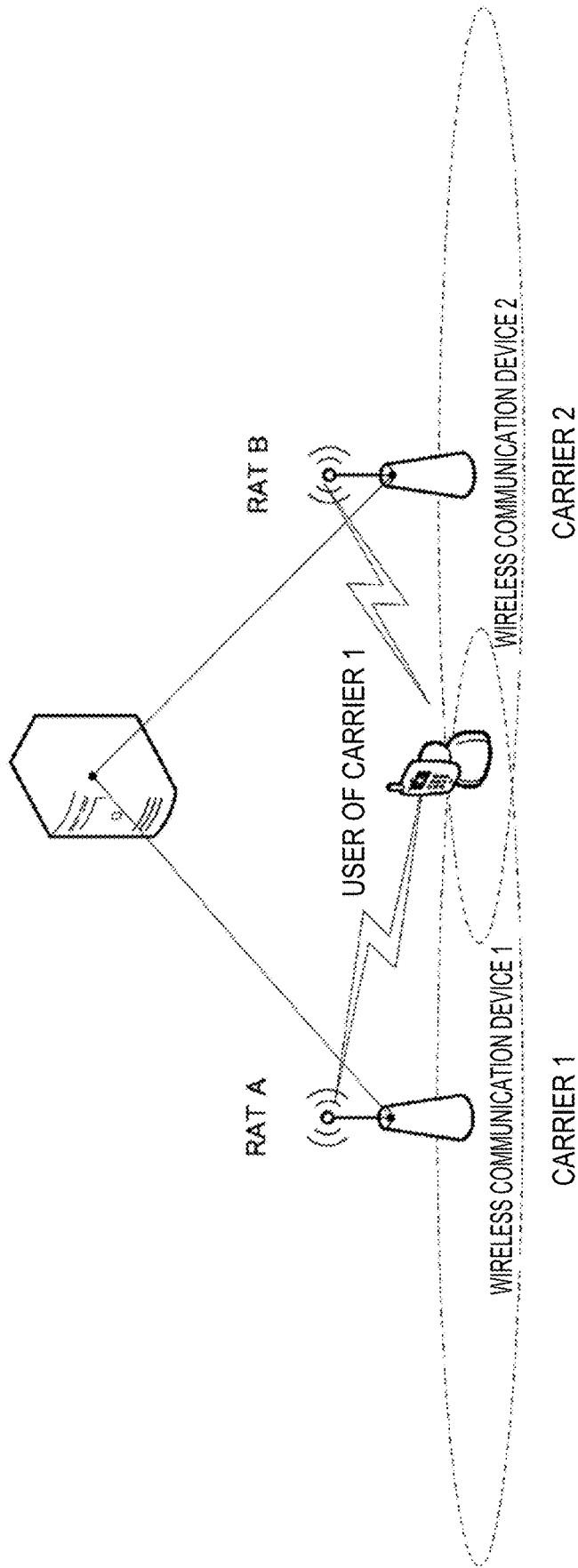
FIG. 7 is a diagram illustrating an example of arrangement of wireless communication devices according to the present embodiment.

FIG. 7 illustrates a situation where the wireless communication devices 30 belonging to different carriers operate different RATs, and coverages partly overlap with each other. In such a case, it can be considered that a sensing type coexistence mechanism such as LBT is not very effective due to a difference in wireless frame configurations, reference signals, or the like. Further, because the wireless communication devices 30 belong to different carriers, it is difficult to realize coexistence among carriers by utilizing unique coexistence algorithm by the network management device 20 or an interface (e.g. an LTE X2 interface) between wireless communication devices. Still further, in a case of TDD, it is desirable to provide a guard band because even adjacent channel interference can become a serious problem.

Therefore, in such a case, an available frequency band which is notified from a frequency management database to each wireless communication device is made to include at least different frequency bands. Further, a TDD frame configuration recommended for each wireless communication device is selected and provided to each wireless communication device.

(Case 5)

Figure 8:
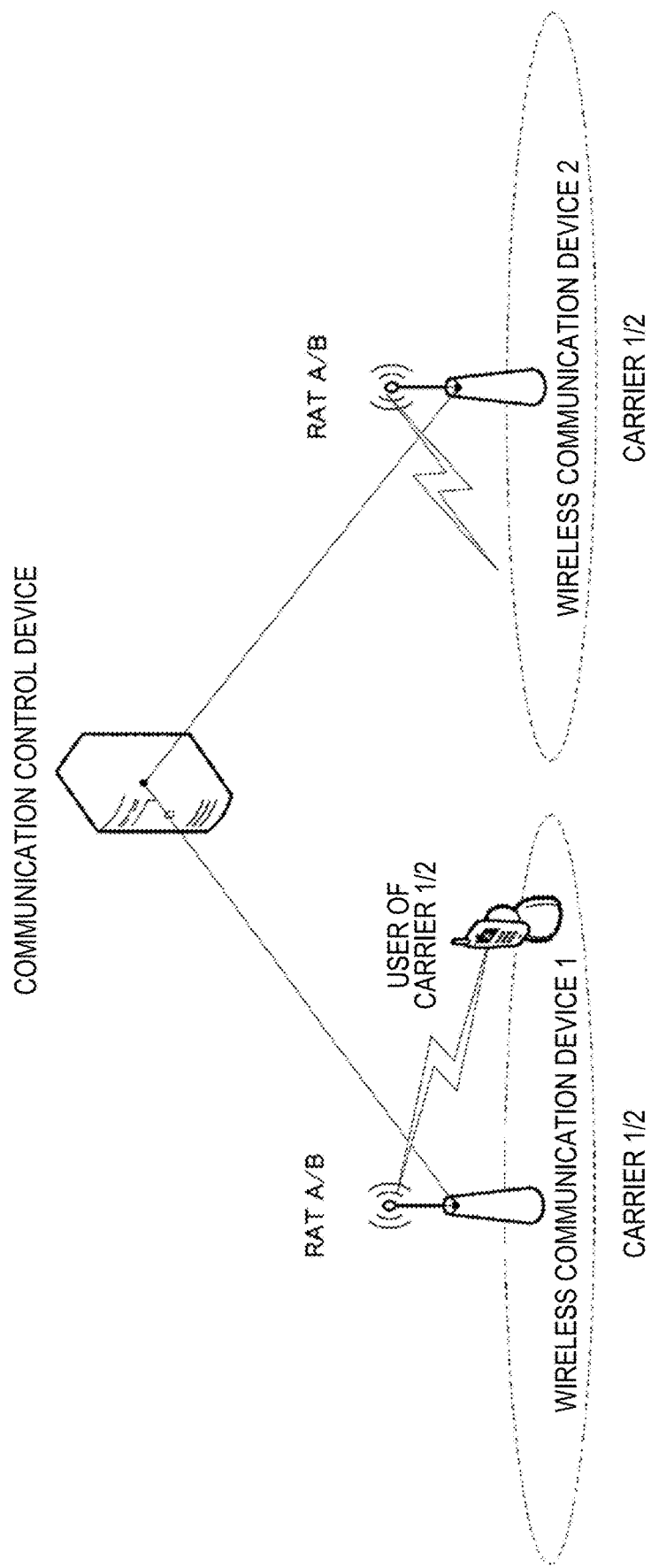
FIG. 8 is a diagram illustrating an example of arrangement of wireless communication devices according to the present embodiment.

FIG. 8 illustrates a situation where coverages do not overlap with each other among a plurality of wireless communication devices 30 regardless of carriers and RATs. In such a case, there is an extremely low possibility that fatal interference occurs among the wireless communication devices regardless of types of carriers and RATs. Therefore, in such a case, the communication control device can notify each wireless communication device of any available frequency band. Preferably, in terms of frequency utilization efficiency, it is desirable that the wireless communication devices are notified of the same frequency band as the available frequency band.

(3) Notification Function

The notification unit 133 typically has a function of generating a message based on the determination result of the determination unit and transmitting the message to the communication unit. Specifically, the recommended operation parameters of the wireless communication device 30 can include one or more pieces of information among recommended radio access technology information, information relating to a recommended frequency band, information relating to a recommended duplex mode or information relating to a recommended transmission time interval.

The recommended radio access technology information is typically an identifier indicating a RAT which is recommended to be operated and/or an operation parameter which is unique to the RAT. The operation parameter which is unique to the RAT is, for example, Transmission Mode specified in LTE.

As the information relating to the recommended frequency band, for example, a beginning frequency band and an end frequency band at which operation is recommended are provided. Alternatively, for example, the number of a band specified in the 3rd generation partnership project (3GPP) may be provided. Alternatively, for example, in the case where a channel number is allocated as in a TV frequency band, the channel number may be provided. Alternatively, for example, the recommended frequency band may be provided using combination of a center frequency and a bandwidth. Whichever information is provided, in the case where operation is recommended in a plurality of frequency bands, a plurality of pieces of information relating to the recommended frequency bands may be provided.

The information relating to the recommended duplex mode includes at least an identifier indicating a duplex mode in which operation is recommended. The information can include an identifier indicating frequency division duplex (FDD), time division duplex (TDD), supplemental downlink (SDL), full duplex, or the like. In the case where the identifier indicates TDD, further, the information includes an identifier indicating a configuration which is being operated among the TDD frame configurations indicated in the above-described Table 1.

The recommended transmission time interval is typically a transmission time interval (TTI).

<2.4. Configuration Example of Wireless Communication Device>

A configuration example of the wireless communication device will be described below with reference to FIG. 9.

Figure 9:
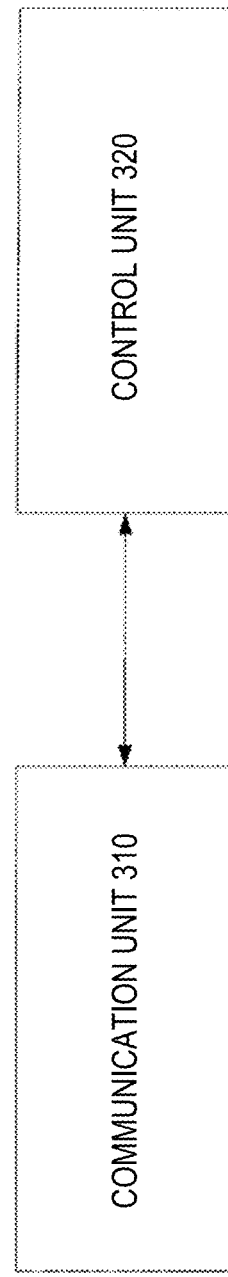
FIG. 9 is a block diagram illustrating an example of a configuration of a wireless communication device according to the present embodiment.

FIG. 9 is a block diagram illustrating an example of a configuration of the wireless communication device 30 according to the present embodiment. As illustrated in FIG. 3, the wireless communication device 30 includes a communication unit 310 and a control unit 320.

The communication unit 310 is a communication interface which mediates communication between the communication control device 10 and the network management device 20 and/or the wireless communication device 30. The communication unit 310 supports arbitrary wireless communication protocol or wired communication protocol and establishes communication connection with the communication control device and/or the network management device 20 and/or the wireless communication device 30. The communication unit 310 can hold a plurality of different communication sessions. In other words, for example, the communication unit 310 can perform communication with the network management device 20 through wired line and communication with other wireless communication devices 30 through wireless line at the same time.

The control unit 320 has a function of controlling communication parameters at the communication unit 310 and generating a message and a packet.

<2.5. Technical Features of Wireless Communication Device>

(1) Communication Function

The communication unit 310 has a function of transmitting a message including information necessary for communication control at the communication control device 10 to the communication control device 10. The information necessary for communication control includes at least information indicating a network to which the wireless communication device belongs, radio access technology information which is being operated, information relating to an operable frequency band, information relating to a duplex mode and information relating to a transmission time interval. Further, in the case where location information is not managed by the NRA or entrusted institution thereof, and it is necessary to acquire the location information using a positioning function provided at the wireless communication device 30 and notify the communication control device 10 of the location information, the message includes the location information. As the information, information equivalent to that described above in "technical features of communication control device" is used.

Further, the communication unit 310 has a function of acquiring the recommended operation parameters selected on the basis of the information at the communication control device 10. The recommended operation parameters can include at least one or more pieces of information among recommended radio access technology information, information relating to a recommended frequency band, information relating to a recommended duplex mode or information relating to a recommended transmission time interval. As the information, information equivalent to that described above in "technical features of communication control device" is used.

(2) Control Function

The control unit 320 has a function of generating a message including information necessary for communication control, which is to be transmitted to the communication control device 10.

Further, the control unit 320 has a function of changing operation parameters of wireless communication performed at the communication unit 310 on the basis of the recommended operation parameters acquired at the communication unit 310.

<2.6. Procedure>

An example of procedure performed in association with introduction of the communication control device 10 and the wireless communication device 30 will be described below with reference to FIG. 10 and FIG. 11.

Figure 10:
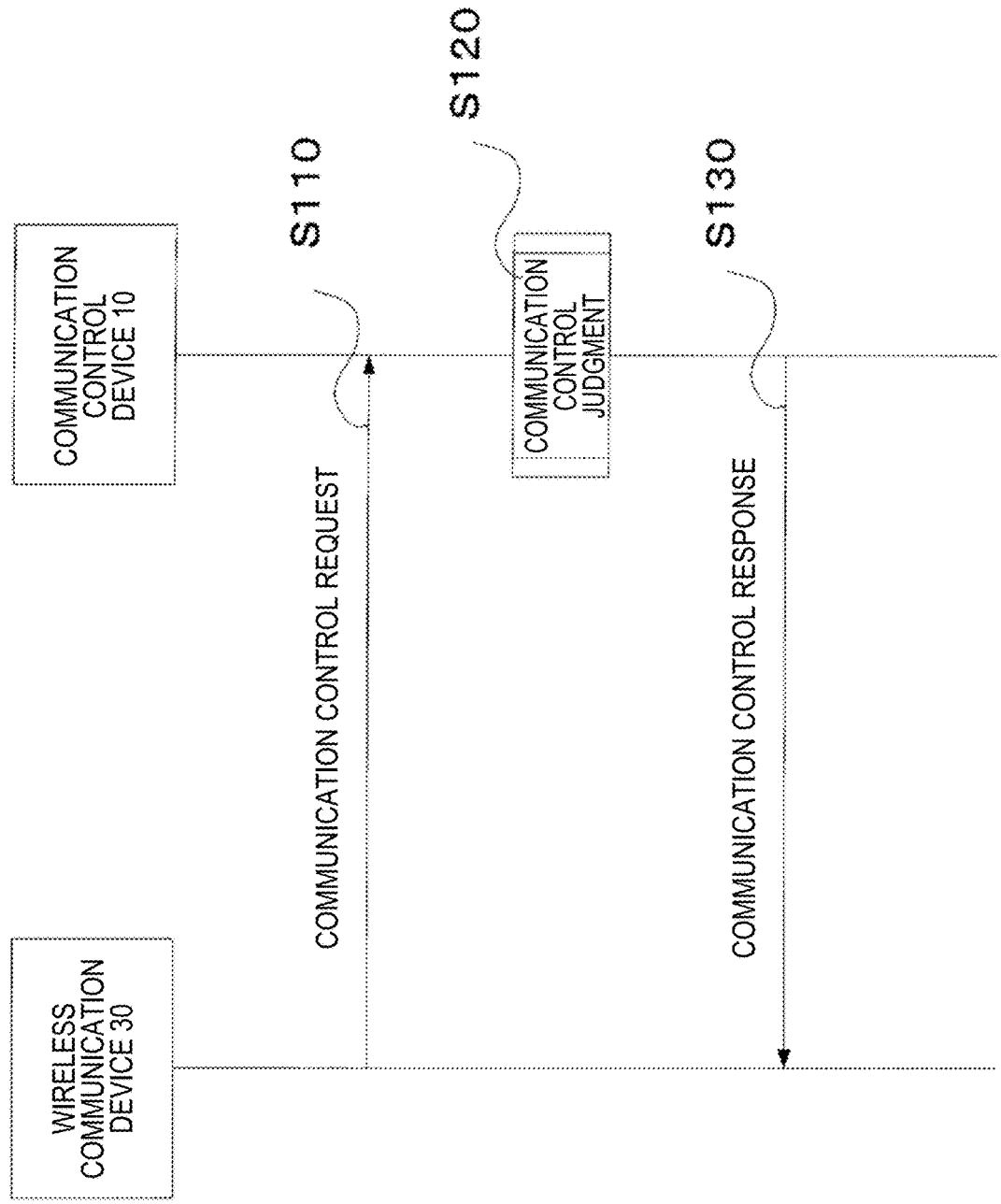
FIG. 10 is a diagram for explaining an example of procedure performed between the communication control device and the wireless communication device according to the present embodiment.

The procedure illustrated in FIG. 10 is procedure for making a request for communication control. Communication control request (S110), communication control judgement (S120) and communication control response (S130) are performed.

The communication control request (S110) includes at least information indicating a network to which the wireless communication device belongs, radio access technology information which is being operated, information relating to an operable frequency band, information relating to a duplex mode, and information relating to a transmission time interval. Further, in the case where location information is not managed by the NRA or entrusted institution thereof, and it is necessary to acquire the location information using a positioning function provided at the wireless communication device 30 and notify the communication control device 10 of the location information, the message includes the location information.

In the communication control judgment (S120), service areas or coverages provided by the respective wireless communication devices are compared using information of one or more wireless communication devices acquired in the communication control request (S110), positional relationship among the wireless communication devices is determined, and the recommended operation parameters are selected.

In the communication control response (S130), one or more pieces of information of recommended radio access technology information, information relating to a recommended frequency band, information relating to a recommended duplex mode or information relating to a recommended transmission time interval can be included.

Figure 11:
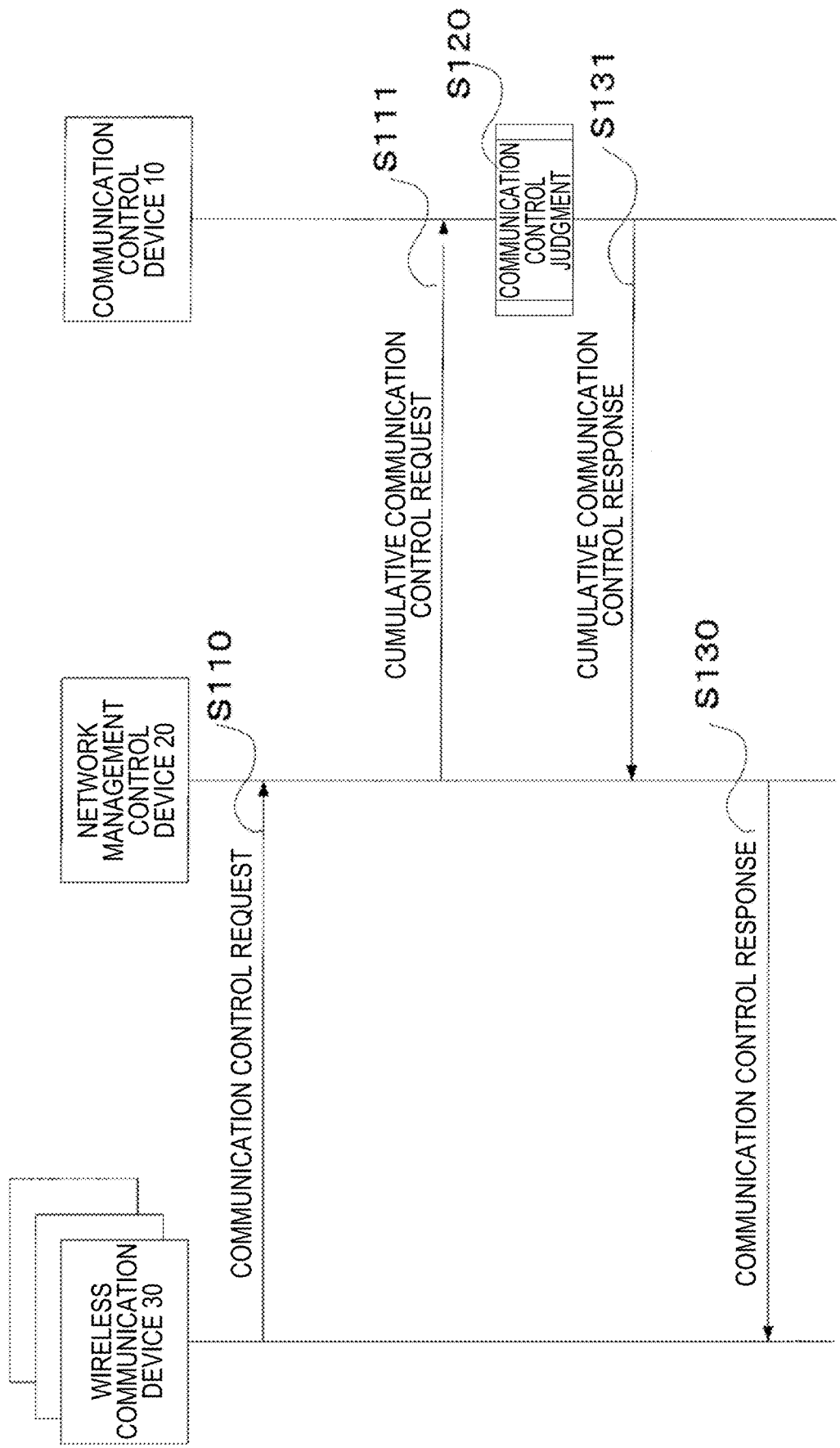
FIG. 11 is a diagram for explaining an example of procedure performed between the communication control device and the wireless communication device according to the present embodiment.

The procedure illustrated in FIG. 11 is procedure in which the wireless communication device 30 makes a request for communication control to the communication control device 10 via the network management control device 20. Communication control request (S110), cumulative communication control request (S111), communication control judgment (S120), cumulative communication control response (S131) and communication control response (S130) are performed.

The communication control request (S110) includes at least information indicating a network to which the wireless communication device belongs, radio access technology information which is being operated, information relating to an operable frequency band, information relating to a duplex mode, and information relating to a transmission time interval. Further, in the case where location information is not managed by the NRA or entrusted institution thereof, and it is necessary to acquire the location information using a positioning function provided at the wireless communication device 30 and notify the communication control device 10 of the location information, the message includes the location information.

The cumulative communication control request (S111) includes communication control requests from one or more wireless communication devices.

In the communication control judgment (S120), service areas or coverages provided by the respective wireless communication devices are compared using the information of one or more wireless communication devices acquired in the communication control request (S110), positional relationship among the wireless communication devices is determined, and the recommended operation parameters are selected.

The cumulative communication control response (S110) includes communication control responses regarding one or more wireless communication devices. Each communication control response can include one or more pieces of information among recommended radio access technology information, information relating to a recommended frequency band, information relating to a recommended duplex mode or information relating to a recommended transmission time interval.

The communication control response (S110) includes communication control responses to the respective wireless communication devices separated from the cumulative communication control response.

3. SECOND EMBODIMENT

Figure 12:
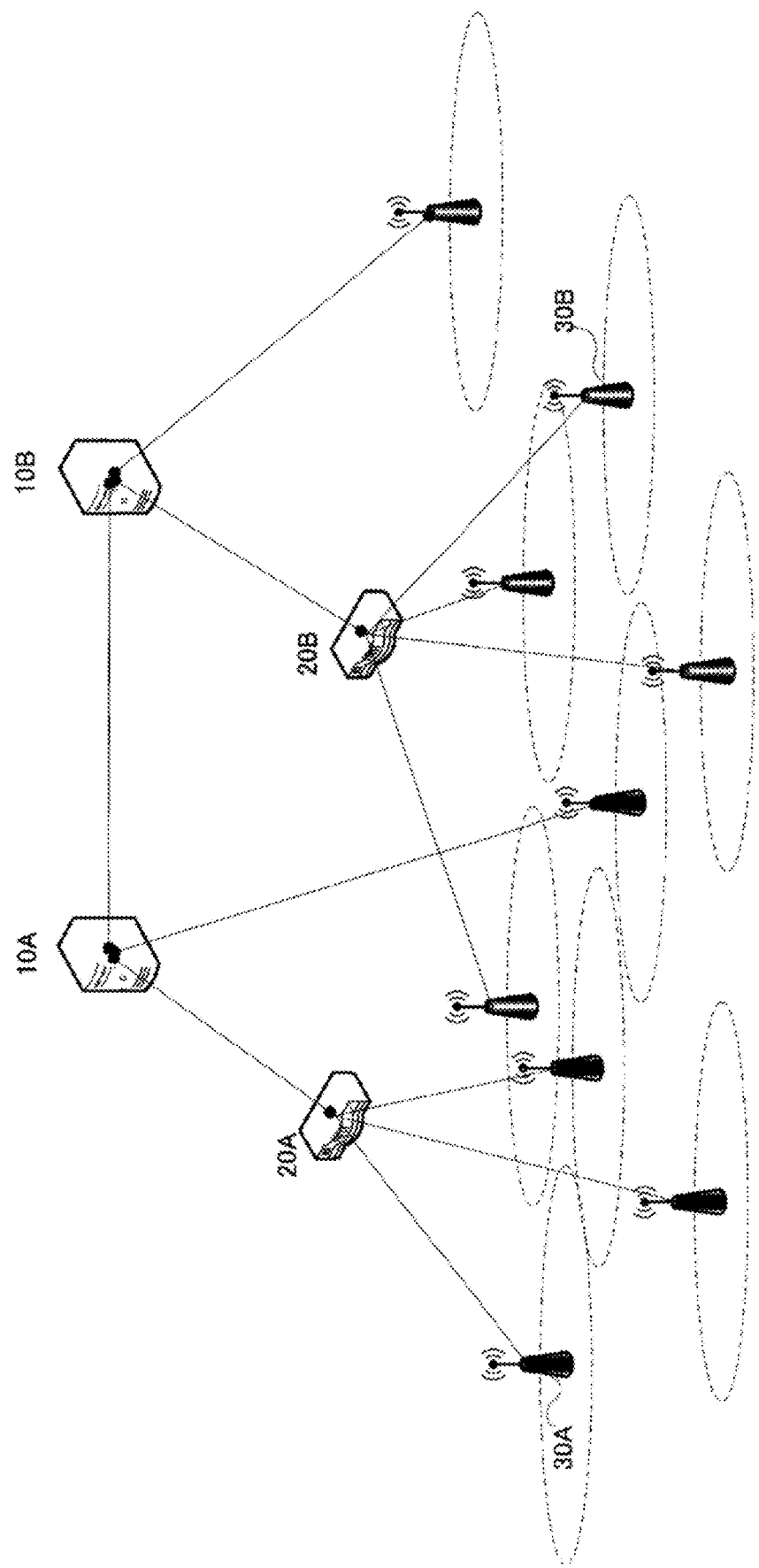
FIG. 12 is an explanatory diagram for explaining outline of a communication system according to an embodiment of the present disclosure.

An architecture according to the second embodiment will be described with reference to FIG. 12. Note that because a configuration similar to that in the first embodiment can be utilized as a configuration under each of the communication control devices, in description of the second embodiment, only description relating to communication among a plurality of communication control devices will be described.

In the second embodiment, there are a plurality of communication control devices 10A and 10B, and these communication control devices perform communication control judgement relating to coexistence while exchanging information relating to subordinate wireless communication devices.

<3.1. Configuration Example of Communication Control Device>

In a similar manner to the first embodiment, the block diagram illustrated in FIG. 3 illustrates an example of a configuration of the communication control device 10 according to the present embodiment. As illustrated in FIG. 3, the communication control device 10 includes the first communication unit 110, the second communication unit 120 and the processing unit 130. Further, the processing unit 130 includes the information acquisition unit 131, the determination unit 132 and the notification unit 133.

The second communication unit 120 is a communication interface which mediates communication with other communication control devices. The second communication unit 120 supports arbitrary wireless communication protocol or wired communication protocol and establishes communication connection with one or more communication control devices.

The processing unit 130 provides various functions of the communication control device 10. The processing unit 130 includes the information acquisition unit 131, the determination unit 132 and the notification unit 133. Note that the processing unit 130 can further include structural elements other than these structural elements. That is, the processing unit 130 can perform operation other than operation of these structural elements. Functions of the processing unit 130 will be described in detail later.

<3.2. Technical Features of Communication Control Device>

(1) Information Acquisition Function

In a similar manner to the first embodiment, the information acquisition unit 131 acquires information necessary for judgment of coexistence control among one or more wireless communication devices 30. In the second embodiment, the information acquisition unit 131 further acquires information relating to wireless communication devices under other communication control devices. The information acquisition unit 131 acquires at least information indicating a network to which the wireless communication device belongs, radio access technology information, information relating to an operable frequency band, information relating to a location, information relating to a duplex mode or information relating to transmission time.

(2) Determination Function

The determination unit 132 typically has a function of performing judgment relating to coexistence control in a similar manner to the first embodiment. Specifically, the determination unit 132 compares service areas or coverages provided by the respective wireless communication devices using information of one or more wireless communication devices acquired at the information acquisition unit and determines positional relationship among the wireless communication devices.

Further, the determination unit 132 performs determination processing such as extraction and selection of information of the corresponding wireless communication devices on the basis of information acquisition requests from other communication control devices.

(3) Notification Function

The notification unit 133 typically has a function of generating a message based on the determination result of the determination unit and transmitting the message to the communication unit in a similar manner to the first embodiment. In the second embodiment, specifically, the notification unit 133 transmits the generated message to the second communication unit 120.

<3.3. Procedure>

An example of procedure performed between the communication control device 10A and the communication control device 10B will be described below with reference to FIG. 13 and FIG. 14.

The procedure illustrated in FIG. 13 is procedure for making a request for acquiring information relating to communication control. Information acquisition request (S141), determination processing relating to information acquisition (S151) and response (S161) are performed.

The information acquisition request (S141) can include, for example, information relating to a geographical location and/or region. For example, the information acquisition request can include coordinate information made up of latitude, longitude and altitude. Further, for example, as the information indicating the geographical region, information such as census tract, area name, prefecture name, state name, town name, block number, and address can be included as information which is administratively defined. Alternatively, for example, the geographical region may be expressed with combination of three or more pieces of coordinate information. Alternatively, for example, the geographical region may be expressed with combination of coordinate information and radius information.

The information acquisition request (S141) can further include information relating to a frequency band as search conditions. For example, a beginning frequency band and an end frequency band are provided. Alternatively, for example, the number of a band specified in the 3rd generation partnership project (3GPP) may be provided. Alternatively, for example, in the case where a channel number is allocated as in a TV frequency band, the channel number may be provided. Alternatively, for example, the frequency band may be designated using combination of a center frequency and a bandwidth. Whichever information is provided, in the case where it is desired to acquire information of wireless communication devices regarding a plurality of frequency bands, a plurality of pieces of information relating to the frequency bands may be provided.

The information acquisition request (S141) can further include information relating to a duplex mode as search conditions. The information can include an identifier indicating frequency division duplex (FDD), time division duplex (TDD), supplemental downlink (SDL), full duplex, or the like.

In the determination processing relating to information acquisition (S151), the corresponding wireless communication device is extracted using the information acquired in the information acquisition request (S141) as the search conditions.

The response (S161) includes information of the wireless communication device extracted in the determination processing relating to information acquisition (S151). At least information indicating a network to which the wireless communication device belongs, radio access technology information, information relating to an operating frequency band, information relating to a location, information relating to a duplex mode or information relating to transmission time are acquired.

Note that, in the case where part or all of the information is managed at an information management device belonging to an external network or an intra-network, the part or all of the information may be acquired from the information management device after the response (S161).

The procedure illustrated in FIG. 14 is procedure for making a request for communication control to other communication control devices. Communication control request (S142), communication control determination processing (S152) and communication control response (S162) are performed.

In the communication control request (S142), for example, a command to change wireless parameters is transmitted. In this case, the communication control request includes at least an identifier which can specify the wireless communication device, and, further, can include combination of one or more pieces of radio access technology information, information relating to an operating frequency, information relating to a duplex mode or information relating to transmission time.

In the communication control determination processing (S152), a target wireless communication device is extracted, and processing of determining whether or not parameters included in the information can be changed is performed on the basis of the information acquired in the communication control request (S142).

In the extraction of the wireless communication device, a target wireless communication device is searched from a list, or the like, of the wireless communication devices managed by the communication control device using the information acquired in the communication control request (S142) as the search conditions.

In the processing of determining whether or not the parameters included in the information can be changed, for example, in the case where changed parameters are specifically designated in the communication control request (S142), it is determined whether or not the extracted wireless communication device can change the parameters to the changed parameters, and the parameters are changed. Alternatively, for example, in the case where changed parameters are not specifically designated in the communication control request (S142), processing of selecting parameters to which the parameters are to be changed by the extracted wireless communication device and processing of calculating parameter values to which the parameter values are to be changed, are performed.

In the communication control response (S162), a response message is generated on the basis of the result of the communication control determination processing (S152), and the message is transmitted to the communication control device which is a request source. Typically, the response message includes at least a processing status code, and, in the case where the processing status code indicates one other than SUCCESS, the response message can include an error message.

4. CONCLUSION

An embodiment of the present disclosure has been described in detail above with reference to FIG. 1 to FIG. 14. As described above, the communication control device according to the present embodiment can acquire information indicating a network to which the wireless communication device managed by the communication control device belongs, radio access technology information, information relating to an operable frequency band, location information, information relating to a duplex mode or information relating to a transmission time interval. By this means, by determining positional relationship among coverages of the wireless communication devices, and selecting operation parameters recommended for the wireless communication device in accordance with the determined positional relationship, it becomes possible to realize coexistence control among the wireless communication devices. Further, the first communication control device according to the present embodiment can acquire radio access technology information, information relating to an operable frequency band, location information, information relating to a duplex mode or information relating to a transmission time interval regarding the wireless communication device managed by the second communication control device. By this means, information necessary for coexistence is shared among the communication control devices. In this manner, it is possible to smoothly perform information exchange among a plurality of communication control devices and coexistence control in which wireless communication devices under different communication control devices is taken into account.

The preferred embodiment of the present disclosure has been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, it is also possible to create a computer program for causing a processor (such as, for example, a CPU and a DSP) provided at the device in the present specification (for example, a base station, a base station device or a module for the base station device, a terminal device or a module for the terminal device) to function as structural elements (such as, for example, the processing unit 130) of the above-described device (in other words, a computer program for causing the above-described processor to execute operation of structural elements of the above-described device). Further, it is also possible to provide a recording medium in which the computer program is recorded. Further, it is also possible to provide a device including a memory in which the above-described computer program is stored and one or more processors which can execute the above-described computer program (for example, a base station, a base station device or a module for the base station device, a terminal device or a module for the terminal device). Further, a method including operation of the structural elements (such as, for example, the processing unit 130) of the above-described device is included in the technology according to the present disclosure.

For example, the processing described herein with reference to the flowcharts and the sequence diagrams does not necessarily have to be executed in the illustrated order. Some processing steps may be executed in parallel. In addition, additional processing steps may also be adopted, while some of the processing steps may be omitted.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A communication control device including:

an information acquisition unit configured to acquire information indicating a network to which one or more wireless communication devices belong, radio access technology information, information relating to an operable frequency band, information relating to a geographical location and/or region, information relating to a duplex mode, or information relating to a transmission time interval;

a determination unit configured to determine positional relationship among coverages of the wireless communication devices by using the information, and select an operation parameter recommended for each of the wireless communication devices in accordance with the determined positional relationship; and a notification unit configured to notify the wireless communication devices of the selected operation parameters.

(2)

The communication control device according to (1), in which the information acquisition unit acquires at least the information relating to the geographical location and/or region and the information relating to the duplex mode, the determination unit determines positional relationship among coverages of a plurality of wireless communication devices operating in TDD and select a TDD frame configuration recommended for each of the wireless communication devices, and the notification unit notifies each of the wireless communication devices of the recommended TDD frame configuration selected by the determination unit.

(3)

The communication control device according to (1) or (2), in which the information acquisition unit acquires information from the wireless communication devices.

(4)

A communication control device including:

an information acquisition unit configured to acquire information indicating a network to which one or more wireless communication devices belong, radio access technology information, information relating to an operable frequency band, information relating to a geographical location and/or region, information relating to a duplex mode, or information relating to a transmission time interval;

a determination unit configured to extract a wireless communication device corresponding to the information; and a notification unit configured to make a notification of the information relating to the wireless communication device extracted by the determination unit.

(5)

The communication control device according to (1), (2), or (4), in which the information acquisition unit acquires information from another communication control device.

(6)

A wireless communication device including:

a communication unit configured to notify a communication control device of information indicating a belonging network, radio access technology information which is being operated, information relating to an operable frequency band, information relating to a duplex mode, and information relating to a transmission time interval, and acquire a recommended operation parameter selected by the communication control device on the basis of the information; and a control unit configured to set an operation parameter on the basis of the recommended operation parameter acquired by the communication unit.

(7)

The wireless communication device according to (6), in which the communication unit at least makes a notification of information relating to a duplex mode and acquires information relating to a recommended TDD frame configuration selected by the communication control device, and the control unit changes an operation parameter of TDD on the basis of the information relating to the recommended TDD frame configuration acquired by the communication unit.

(8)

A method including:

acquiring information indicating a network to which one or more wireless communication devices belong, radio access technology information, information relating to an operable frequency band, information relating to a geographical location and/or region, information relating to a duplex mode, or information relating to a transmission time interval;

determining positional relationship among coverages of the wireless communication devices by using the information, and selecting an operation parameter recommended for each of the wireless communication devices in accordance with the determined positional relationship; and notifying the wireless communication devices of the selected operation parameters.

(9)

A method including:

acquiring information indicating a network to which one or more wireless communication devices belong, radio access technology information, information relating to an operable frequency band, information relating to a geographical location and/or region, information relating to a duplex mode, or information relating to a transmission time interval;

extracting a wireless communication device corresponding to the information; and making a notification of the information relating to the extracted wireless communication device.

(10)

A method including:

notifying a communication control device of information indicating a belonging network, radio access technology information which is being operated, information relating to an operable frequency band, information relating to a duplex mode, and information relating to a transmission time interval and acquiring a recommended operation parameter selected by the communication control device on the basis of the information; and setting an operation parameter on the basis of the recommended operation parameter.

(11)

A program for implementing:

an information acquisition unit configured to acquire information indicating a network to which one or more wireless communication devices belong, radio access technology information, information relating to an operable frequency band, information relating to a geographical location and/or region, information relating to a duplex mode, or information relating to a transmission time interval;

a determination unit configured to determine positional relationship among coverages of the wireless communication devices by using the information and select an operation parameter recommended for each of the wireless communication devices in accordance with the determined positional relationship; and a notification unit configured to notify the wireless communication devices of the selected operation parameters.

(12)

A program for implementing:

an information acquisition unit configured to acquire information indicating a network to which one or more wireless communication devices belong, radio access technology information, information relating to an operable frequency band, information relating to a geographical location and/or region, information relating to a duplex mode, or information relating to a transmission time interval;

a determination unit configured to extract a wireless communication device corresponding to the information; and a notification unit configured to make a notification of the information relating to the wireless communication device extracted by the determination unit.

(13)

A program for implementing:

a communication unit configured to notify a communication control device of information indicating a belonging network, radio access technology information which is being operated, information relating to an operable frequency band, information relating to a duplex mode, and information relating to a transmission time interval, and acquiring a recommended operation parameter selected by the communication control device on the basis of the information; and a control unit configured to set an operation parameter on the basis of the recommended operation parameter acquired by the communication unit.

REFERENCE SIGNS LIST

10 communication control device
110 first communication unit
120 second communication unit
130 processing unit
131 information acquisition unit
132 determination unit
133 notification unit
20 network management control device
30 wireless communication device
310 communication unit
320 control unit

The invention claimed is:

1. A communication control device that controls two or more wireless communication devices, the two or more wireless communication devices secondarily using part of or all of frequency channels for a primary system, the communication control device comprising circuitry configured to:

acquire information for the two or more wireless communication devices from respective ones of the two or more wireless communication devices, the information including:
location information relating to a geographical location of each of the two or more wireless communication devices, and
TDD information relating to a TDD frame configuration of each of the two or more wireless communication devices;

determine a positional relationship among coverages of the two or more wireless communication devices based on the information, and select a recommended TDD frame configuration for each of the two or more wireless communication devices based on the TDD information and the determined positional relationship; and notify each of the two or more wireless communication devices of the recommended TDD frame configuration.

2. The communication control device according to claim 1, wherein the recommended TDD frame configuration is set based on the acquired TDD frame configuration.

3. The communication control device according to claim 1, wherein the information acquisition circuitry acquires information from another communication control device.

4. A wireless communication device that secondarily uses part of or all of frequency channels for a primary system, the wireless communication device comprising circuitry configured to:

notify, to a communication control device, first information for the wireless communication device, the first information including:
location information relating to a geographical location of the wireless communication device, and
TDD information relating to a TDD frame configuration of the wireless communication device;

acquire a recommended TDD frame configuration selected by the communication control device; and set a TDD frame configuration based on the recommended TDD frame configuration, wherein the recommended TDD frame configuration is selected by the communication control device based on:
the first information for the wireless communication device, and
second information for other second wireless communication devices, wherein the second information for the other second wireless communication devices is acquired from respective ones of the other wireless communication devices by the communication control device, the second information including:
location information relating to a geographical location of each of the other second wireless communication devices, and
TDD information relating to a TDD frame configuration of each of the other second wireless communication devices.

5. A method performed by a communication control device that controls two or more wireless communication devices, the two or more wireless communication devices secondarily using part of or all of frequency channels for a primary system, the method comprising:

acquiring information for two or more wireless communication devices from respective ones of the two or more wireless communication devices, the information including:
location information relating to a geographical location of each of the two or more wireless communication devices, and
TDD information relating to a TDD frame configuration of each of the two or more wireless communication devices;

determining a positional relationship among coverages of the two or more wireless communication devices based on the information, and selecting a recommended TDD frame configuration for each of the two or more wireless communication devices based on the TDD information and the determined positional relationship; and notifying each of the two or more wireless communication devices of the recommended TDD frame configuration.

6. The method according to claim 5, wherein the recommended TDD frame configuration is set based on the acquired TDD frame configuration.

7. The method according to claim 5, further comprising: acquiring information from another communication control device.

8. A method by a wireless communication device that secondarily uses part of or all of frequency channels for a primary system, the method comprising:

notifying, to a communication control device, first information for the wireless communication device, the first information including:
  location information relating to a geographical location of the wireless communication device, and
  TDD information relating to a TDD frame configuration of the wireless communication device, acquiring a recommended TDD frame configuration that is selected by the communication control device; and setting a TDD frame configuration based on the recommended TDD frame configuration, wherein the recommended TDD frame configuration is selected by the communication control device based on:
  the first information for the wireless communication device, and
  second information for other second wireless communication devices,
  wherein the second information for the other second wireless communication devices is acquired from respective ones of the other wireless communication devices by the communication control device,
  the second information for the second wireless communication device including:
    location information relating to a geographical location of each of the other second wireless communication devices, and
    TDD information relating to a TDD frame configuration of each of the other second wireless communication devices.

9. A non-transitory computer readable medium including a program which causes a device to execute:

acquiring information for two or more wireless communication devices from respective ones of the two or more wireless communication devices, the information including:
  location information relating to a geographical location of each of the two or more wireless communication devices, and
  TDD information relating to a TDD frame configuration of each of the two or more wireless communication devices;

determining a positional relationship among coverages of the two or more wireless communication devices based on the information, and selecting a recommended TDD frame configuration for each of the two or more wireless communication devices based on the TDD information and the determined positional relationship; and notifying each of the two or more wireless communication devices of the recommended TDD frame configuration.

10. A non-transitory computer readable medium including a program which causes a wireless communication device that secondarily uses part of or all of frequency channels for a primary system to execute a method, the method comprising:

notifying, to a communication control device, first information for the wireless communication device, the first information including:
  location information relating to a geographical location of the wireless communication device, and
  TDD information relating to a TDD frame configuration of the wireless communication device;

acquiring a recommended TDD frame configuration that is selected by the communication control device; and setting a TDD frame configuration based on the recommended TDD frame configuration, wherein the recommended TDD frame configuration is selected by the communication control device based on:
  the first information for the wireless communication device, and
  second information for other second wireless communication devices,
  wherein the second information for the other second wireless communication devices is acquired from respective ones of the other wireless communication devices by the communication control device,
  the information for the second wireless communication device including:
    location information relating to a geographical location of each of the second wireless communication devices, and
    TDD information relating to a TDD frame configuration of each of the second wireless communication devices.

* * * * *

UNITED STATES PATENT AND TRADEMARK OFFICE
CERTIFICATE OF CORRECTION

PATENT NO. : 11,647,488 B2
APPLICATION NO. : 17/229882
DATED : May 9, 2023
INVENTOR(S) : Furuichi It is certified that error appears in the above-identified patent and that said Letters Patent is hereby corrected as shown below:

In the Claims

Column 22, Line 17, Claim 3, "the information acquisition circuitry acquires" should read -- the circuitry acquires --.

Signed and Sealed this
Fifteenth Day of August, 2023

Katherine Kelly Vidal
*Director of the United States Patent and Trademark Office*